United States Patent
Sakai et al.

(10) Patent No.: US 7,135,749 B2
(45) Date of Patent: Nov. 14, 2006

(54) PRESSURE SENSOR

(75) Inventors: Shigefumi Sakai, Miyagi-ken (JP); Munemitsu Abe, Miyagi-ken (JP)

(73) Assignee: Alps Electric Co., Ltd., Ota-ku (JP)

( * ) Notice: Subject to any disclaimer, the term of this patent is extended or adjusted under 35 U.S.C. 154(b) by 157 days.

(21) Appl. No.: 11/028,908

(22) Filed: Jan. 3, 2005

(65) Prior Publication Data

US 2005/0156241 A1    Jul. 21, 2005

(30) Foreign Application Priority Data

Jan. 16, 2004 (JP) ............................. 2004-009710

(51) Int. Cl.
*H01L 29/84* (2006.01)

(52) U.S. Cl. ............... 257/419; 257/418; 257/E29.324; 361/283.4; 73/861.42; 73/718; 73/724; 438/53

(58) Field of Classification Search ............... 257/419; 438/53; 361/283.4; 73/861.47, 718, 724
See application file for complete search history.

(56) References Cited

U.S. PATENT DOCUMENTS

| | | | |
|---|---|---|---|
| 4,701,826 A * | 10/1987 | Mikkor | 361/283.4 |
| 5,369,544 A | 11/1994 | Mastrangelo | |
| 5,585,311 A * | 12/1996 | Ko | 438/53 |
| 5,740,594 A * | 4/1998 | Lukasiewicz et al. | 29/25.41 |
| 6,109,113 A * | 8/2000 | Chavan et al. | 73/718 |
| 6,122,973 A * | 9/2000 | Nomura et al. | 73/724 |
| 6,382,030 B1 * | 5/2002 | Kihara et al. | 73/718 |
| 6,445,053 B1 * | 9/2002 | Cho | 257/417 |
| 6,564,643 B1 * | 5/2003 | Horie et al. | 73/724 |
| 6,578,427 B1 * | 6/2003 | Hegner | 73/724 |
| 7,080,560 B1 * | 7/2006 | Takizawa et al. | 73/754 |

FOREIGN PATENT DOCUMENTS

JP    4-9727    1/1992

* cited by examiner

*Primary Examiner*—Bradley K. Smith
*Assistant Examiner*—Steven J. Fulk
(74) *Attorney, Agent, or Firm*—Beyer, Weaver & Thomas LLP.

(57) ABSTRACT

A pressure sensor includes a silicon-on-insulator (SOI) substrate, a glass substrate bonded to the SOI substrate by anode bonding, a silicon island formed on a part of a silicon layer of the SOI substrate and surrounded by a groove extending to an insulating layer of the SOI substrate, a through hole formed in the glass substrate, and an output electrode that is made of a conductive material, is disposed inside the through hole, and is electrically connected to an electrode formed on the glass substrate via the silicon island.

4 Claims, 6 Drawing Sheets

PRESSURE SENSOR

BACKGROUND OF THE INVENTION

1. Field of the Invention

The present invention relates to the structures of capacitive pressure sensors requiring hermetic sealing.

2. Description of the Related Art

A known capacitive pressure sensor for measuring absolute pressure includes a silicon substrate and a glass substrate that are bonded so as to seal a microgap therebetween, thereby forming a reference pressure chamber. The silicon substrate has a pressure-sensitive diaphragm portion for sensing the pressure to be measured.

An electrode is formed on the pressure-sensitive diaphragm portion by diffusing an impurity using semiconductor manufacturing technology while another electrode is formed on the glass substrate by depositing a thin metal film using, for example, vapor deposition or sputtering. Leads from the two electrodes are connected to the outside via a diffusion lead and a metal lead extending between the bonding surfaces of the silicon and glass substrates. The diffusion lead and metal lead are connected to the corresponding electrodes of a capacitance-sensing IC chip with gold (Au) wires by wedge bonding.

Examples of known structures for sealing the bonding surfaces of the silicon and glass substrates, between which the diffusion lead and metal lead extend, include a sealing structure in which the parts to be sealed are clamped with a resin material such as polyimide (for example, see Japanese Unexamined Patent Application Publication No. 07-209117), a sealing structure in which a metal film is formed locally at a lead portion (for example, see Japanese Unexamined Patent Application Publication No. 08-097438), and a sealing structure in which a vacuum space is created and sealed by forming a silicon oxide film using low pressure chemical vapor deposition (LPCVD) (for example, see Japanese Unexamined Patent Application Publication No. 11-284204).

According to another known structure, a silicon sealing cover is disposed over a through hole at an electrode lead portion (for example, see Japanese Unexamined Patent Application Publication No. 04-009727).

Figure 10:
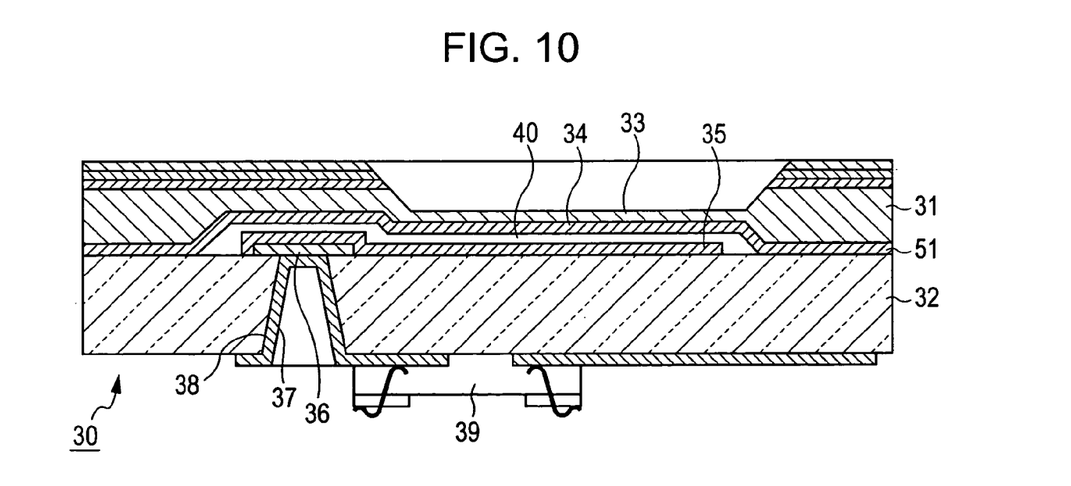
FIG. 10 illustrates a sectional structure of an example of a conventional pressure sensor.

FIG. 10 illustrates an example of a sectional structure of a conventional capacitive pressure sensor 30 disclosed in Japanese Unexamined Patent Application Publication No. 04-009727.

In FIG. 10, a silicon substrate 31 having a pressure-sensitive diaphragm portion 33 for sensing the pressure to be measured is bonded to a glass substrate 32 to form a microgap as a reference pressure chamber 40. A first electrode 35 made of a thin metal film is formed on the side of the glass substrate 32 facing the reference pressure chamber 40 by vapor deposition or sputtering. The glass substrate 32 is perforated so as to form a first hole portion 38. This hole portion 38 is sealed on the reference pressure chamber 40 side by bonding a silicon cover plate 36. A lead portion 37 made of a thin metal film is formed over the surface of the cover plate 36 inside the hole portion 38 and the inner surface of the hole portion 38 by vapor deposition or sputtering. Accordingly, the electrode 35 is electrically connected to the lead portion 37 via the cover plate 36.

On the other hand, a second electrode 34 is formed on the side of the pressure-sensitive diaphragm portion 33 facing the reference pressure chamber 40 by diffusing an impurity onto the overall surface of the silicon substrate 31. A diffusion surface 51 formed on the silicon substrate 31 between the bonding sides of the silicon substrate 31 and the glass substrate 32 is electrically connected to another lead portion formed in a second hole portion (not illustrated) formed in the glass substrate 32.

A capacitance-sensing IC chip 39, which is an interface circuit, is bonded to the glass substrate 32. The first and second lead portions are connected to the corresponding electrodes of the capacitance-sensing IC chip 39 with gold (Au) wires by wedge bonding.

The portion of the silicon substrate 31 that is opposed to the cover plate 36 bonded to the glass substrate 32 is recessed in agreement with the protrusion of the cover plate 36 so that the first electrode 35 of the glass substrate 32 can be electrically insulated from the second electrode 34 of the silicon substrate 31.

The clamping structure using a resin as shown in Japanese Unexamined Patent Application Publication No. 07-209117 and the sealing methods using a metal or oxide film as shown in Japanese Unexamined Patent Application Publication No. 08-097438 and Japanese Unexamined Patent Application Publication No. 11-284204, however, lack long-term reliability and have a problem in terms of resistance to higher pressures. In particular, the sealing structures in Japanese Unexamined Patent Application Publication No. 07-209117 and Japanese Unexamined Patent Application Publication No. 08-097438 also have a problem in that they involve a complicated process including the step of depositing a part of a lead portion and are therefore unsuitable for mass production.

In addition, the sealing structure using a silicon cover plate as disclosed in Japanese Unexamined Patent Application Publication No. 04-009727 further involves the step of forming the cover over a through hole, and also has difficulty in reducing the size of devices because this structure requires a space for attaching the cover plate.

SUMMARY OF THE INVENTION

To solve the above problems, the present invention aims at providing a pressure sensor in which the overall vacuum sealing surfaces of a silicon substrate and a glass substrate are sealed by anode bonding to attain excellent reliability and resistance to higher pressures and to enable a process to be carried out with excellent mass productivity. In addition, the present invention aims at providing a compact pressure sensor including a diaphragm with a precisely controlled thickness and having small variations in properties.

To solve the above problems, the present invention provides a capacitive pressure sensor for measuring pressure according to changes in interelectrode capacitance. This pressure sensor includes a silicon-on-insulator (SOI) substrate having a pressure-sensitive diaphragm portion that deflects in response to the pressure to be measured, a glass substrate bonded to the SOI substrate by anode bonding, a reference pressure chamber, for providing a reference value for the pressure to be measured, formed by sealing a microgap between the bonding sides of the two substrates in the position corresponding to the position where the pressure-sensitive diaphragm portion is formed, a first electrode formed on a surface of a silicon layer of the SOI substrate, a second electrode made of a conductive material and formed on the surface of the glass substrate facing the pressure-sensitive diaphragm portion in the reference pressure chamber, a silicon island that is formed on a part of the silicon layer of the SOI substrate bonded to the glass substrate and that is surrounded by a groove extending to an insulating layer of the SOI substrate, a second through hole formed in the glass substrate in the vicinity of the reference pressure chamber, and a second output electrode that is made of a conductive material, is disposed inside the second through hole, and is electrically connected to the second electrode via the silicon island.

The pressure sensor according to the present invention may further include a first through hole formed in the glass substrate in the vicinity of the reference pressure chamber and a first output electrode that is made of a conductive material, is disposed inside the first through hole, and is electrically connected to the first electrode at an end of the first through hole.

For the pressure sensor according to the present invention, additionally, the planar shape of the silicon island may be circular or rectangular.

The pressure sensor having the above structure, in which the overall vacuum sealing surfaces of the silicon substrate and glass substrate are sealed by anode bonding, has a long-term stable sealing effect and sufficient resistance for maintaining sealing at higher pressures, and can be produced by a process with excellent mass productivity. In addition, the present invention can provide a compact pressure sensor including a diaphragm with a precisely controlled thickness and having small variations in properties.

DESCRIPTION OF THE PREFERRED EMBODIMENTS

[First Embodiment]

Figure 1:
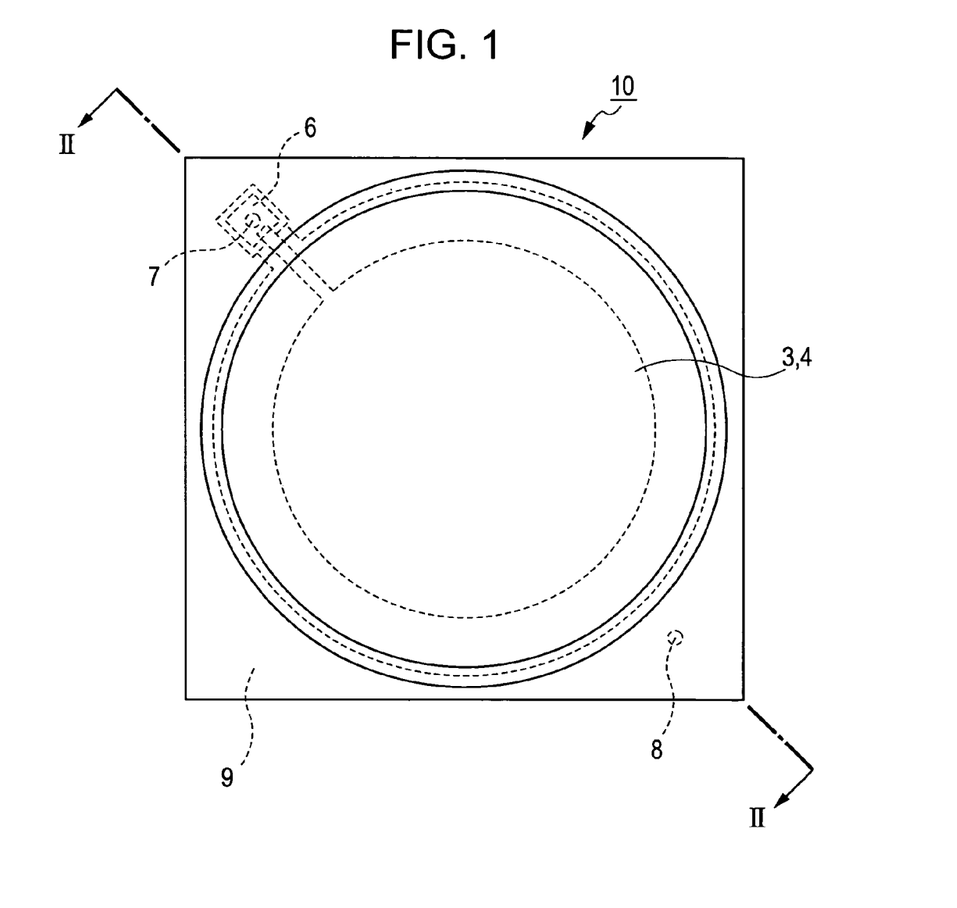
FIG. 1 is a plan view of a pressure sensor according to a first embodiment of the present invention.
Figure 2:
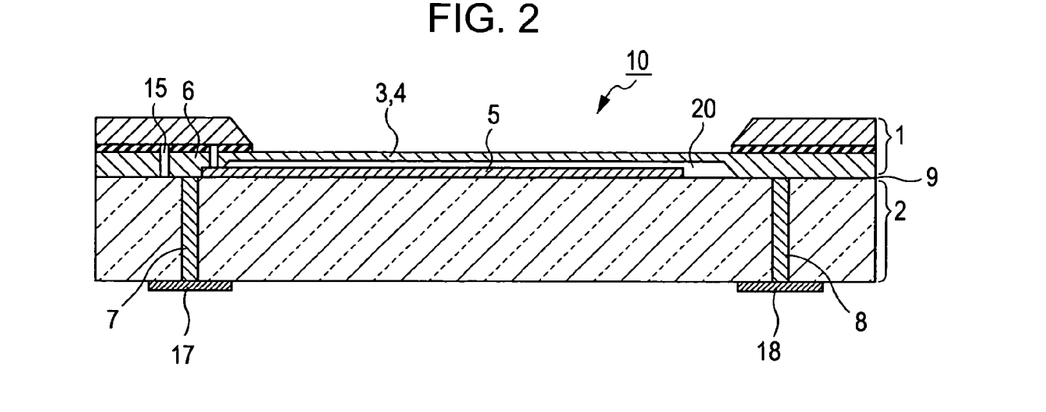
FIG. 2 is a sectional view, taken along line II—II, of the pressure sensor in FIG. 1.

FIG. 1 is a plan view of a pressure sensor according to a first embodiment of the present invention. FIG. 2 is a sectional view, taken along line II—II, of the pressure sensor in FIG. 1.

In FIG. 1, a pressure-sensitive diaphragm portion 3 made of a silicon substrate is disposed in the center of a pressure sensor 10. A first electrode (diaphragm electrode) 4 is formed on the pressure-sensitive diaphragm portion 3, namely the silicon substrate. An output electrode 7 for a second electrode 5 (sensing electrode) and an output electrode 8 for the first electrode 4 are formed in a diagonal line with the pressure-sensitive diaphragm portion 3 disposed therebetween. A silicon island 6 is provided around the output electrode 7 for the second electrode 5. A silicon-on-insulator (SOI) substrate 1 and a glass substrate 2 are bonded, except for the pressure-sensitive diaphragm portion 3 and the silicon island 6, by a known method, namely anode bonding, so as to seal the pressure-sensitive diaphragm portion 3.

Referring to the sectional structure shown in FIG. 2, the SOI substrate 1 is bonded on the top of the glass substrate 2 in the pressure sensor 10 according to the first embodiment of the present invention. The second electrode 5, which is made of a thin metal film, is formed on the side of the glass substrate 2 facing the SOI substrate 1 by vapor deposition or sputtering. The output electrode 8 for the first electrode 4 and the output electrode 7 for the second electrode 5 extend through through holes in the glass substrate 2, and are connected to external connection terminals 18 and 17, respectively, on the reverse side of the glass substrate 2.

On the other hand, the pressure-sensitive diaphragm portion 3, which is made of an etched thin silicon substrate, is formed in the center of the SOI substrate 1. The first electrode 4 is formed on the pressure-sensitive diaphragm portion 3 in the center of the silicon substrate by diffusing an impurity onto the overall surface, including the pressure-sensitive diaphragm portion 3, of the silicon substrate facing the glass substrate 2 so as to form a conductor. The silicon substrate, except for the pressure-sensitive diaphragm portion 3, serves as a lead portion for the first electrode 4.

The pressure-sensitive diaphragm portion 3 is shaped in a thin film form by etching away a silicon substrate 13 and an insulating film 12 described later and also partially removing a remaining opposite silicon substrate 11.

In addition, the silicon island 6 is defined by a groove 15 in the vicinity of the pressure-sensitive diaphragm portion 3 of the SOI substrate 1. The groove 15, which surrounds the silicon island 6, is formed by cutting the silicon substrate 11 and the insulating film 12, described later, on the side of the SOI substrate 1 facing the glass substrate 2. The silicon island 6 is therefore electrically insulated from the first electrode 4, and its contiguous lead portion, formed on the pressure-sensitive diaphragm portion 3.

The SOI substrate 1 and glass substrate 2 having the above structures are stacked and bonded by anode bonding, as shown in FIG. 2. The pressure-sensitive diaphragm portion 3 of the SOI substrate 1 is recessed by etching so as to form a slight gap between the SOI substrate 1 and the glass substrate 2. The peripheries of the SOI substrate 1 and glass substrate 2 are hermetically sealed by anode bonding to define a reference pressure chamber 20. In the bonding, a part of the silicon island 6 of the SOI substrate 1 is overlapped with the lead portion of the second electrode 5 formed on the glass substrate 2 so that the second electrode 5 can be electrically connected to the output electrode 7 and external connection terminal 17 for the second electrode 5 via the silicon island 6.

The pressure sensor 10 having the above structure can sense differences in pressure between a measurement environment and the reference pressure chamber 20 with high sensitivity according to changes in the capacitance between the diaphragm electrode of the pressure-sensitive diaphragm portion 3 and the sensing electrode.

According to the above pressure sensor 10, the lead portion for the second electrode 5 formed on the glass substrate 2 is electrically connected to the output electrode 7 and external connection terminal 17 for the second electrode 5 via the silicon island 6. The overall surfaces of the SOI substrate 1, including the silicon island 6, and the glass substrate 2 are bonded by anode bonding except for the pressure-sensitive diaphragm portion 3. The sensor thus produced has good hermeticity and excellent durability. In addition, no need for additional components allows the production of a compact sensor. Furthermore, the sensor can be produced using only general semiconductor manufacturing techniques typified by etching, thus enabling a process that is simple and advantageous for mass production.

[Second Embodiment]

Figure 3:
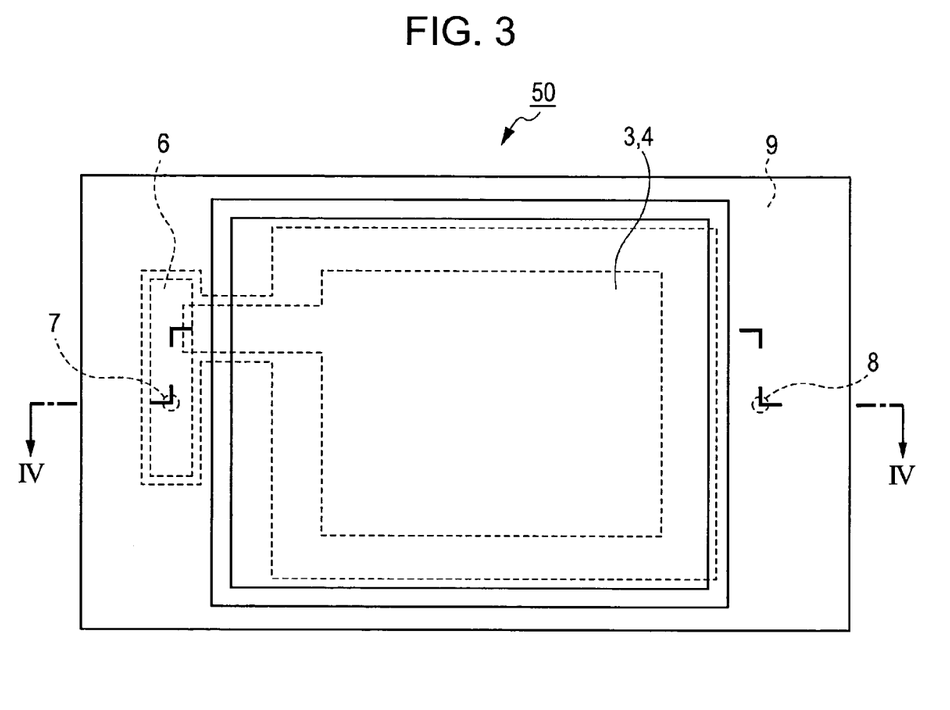
FIG. 3 is a plan view of a pressure sensor according to a second embodiment of the present invention.
Figure 4:
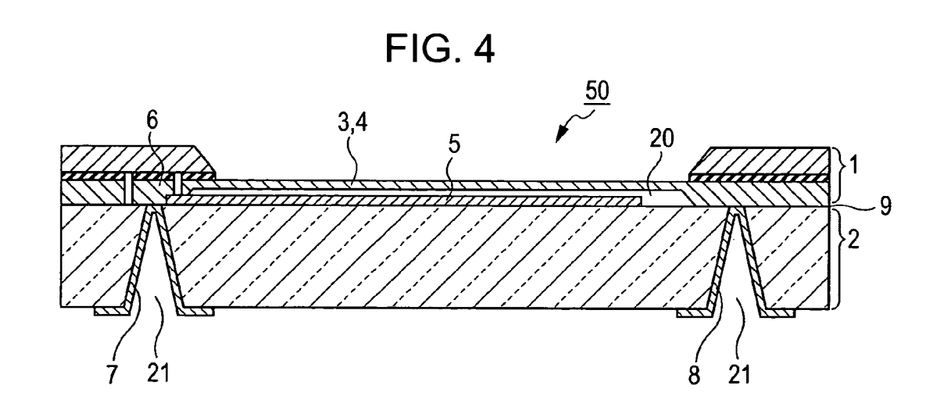
FIG. 4 is a sectional view, taken along line IV—IV, of the pressure sensor in FIG. 3.

FIG. 3 is a plan view of a pressure sensor according to a second embodiment of the present invention. FIG. 4 is a sectional view, taken along line IV—IV, of the pressure sensor in FIG. 3.

A pressure sensor 50 according to the second embodiment of the present invention in FIGS. 3 and 4 is different from the pressure sensor 10 according to the first embodiment of the present invention in FIGS. 1 and 2 in that the pressure-sensitive diaphragm portion 3 and the silicon island 6 are rectangular and that the output electrodes 7 and 8 formed in the glass substrate 2 are conical in cross section. No detailed description is given below because the structures and features of the individual parts are the same as those in the first embodiment.

The output electrodes 7 and 8 that are conical in cross section are advantageous in that deep through holes can be readily formed by sandblasting.

The pressure-sensitive diaphragm portion 3 may be circular or rectangular.

A process for producing a pressure sensor according to the present invention will now be described.

FIGS. 5A to 8 are sectional views illustrating a process for producing the pressure sensor according to the second embodiment of the present invention.

Figure 5A:
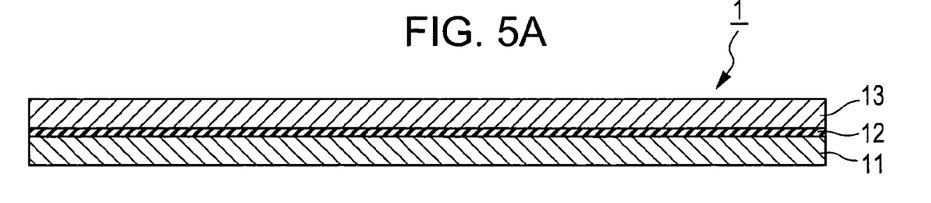
FIGS. 5A, 5B, 5C, and 5D are sectional views illustrating the steps of processing an SOI substrate of a pressure sensor according to the present invention.
Figure 5B:
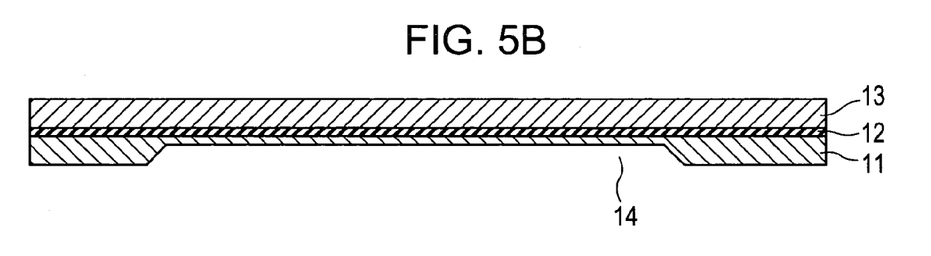
Figure 5C:
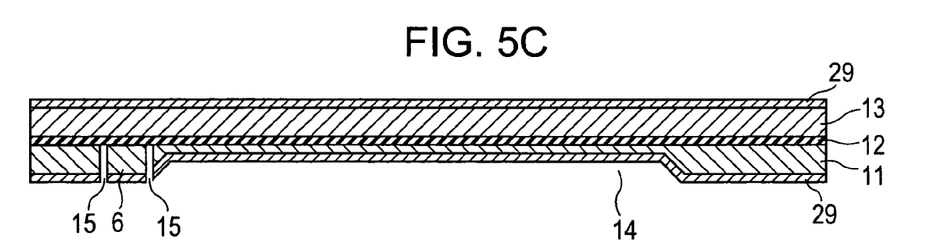
Figure 5D:
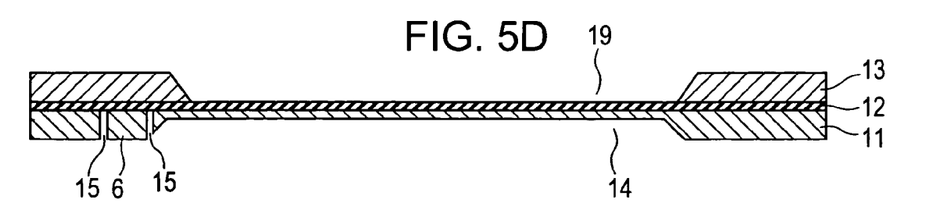
Figure 6A:
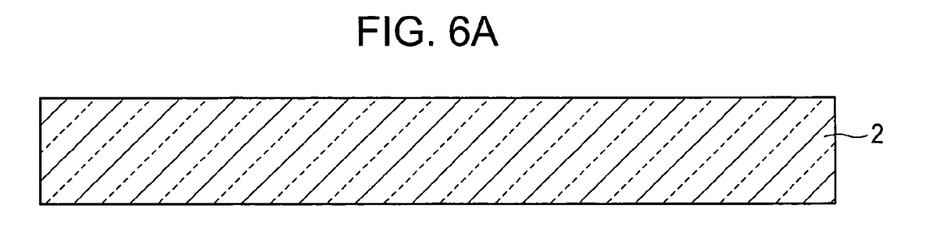
FIGS. 6A, 6B, and 6C are sectional views illustrating the steps of processing a glass substrate of the pressure sensor according to the present invention.
Figure 6B:
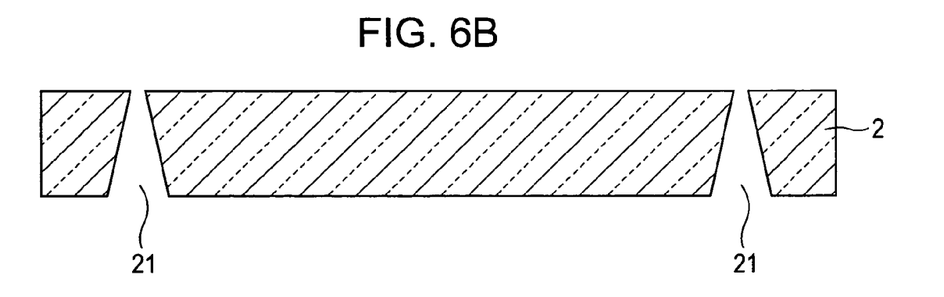
Figure 6C:
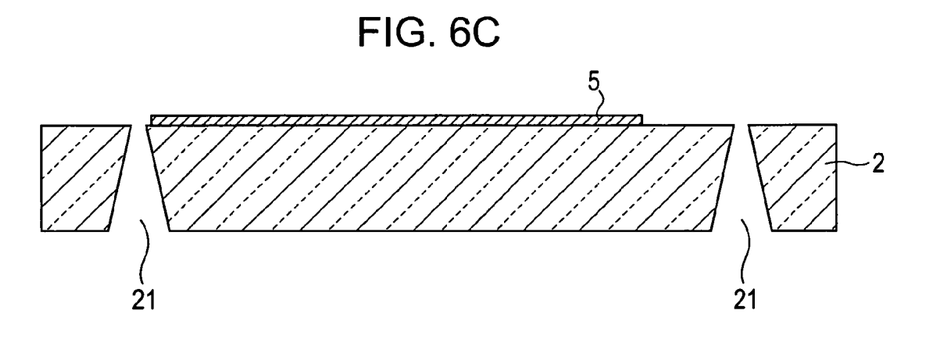
Figure 7:
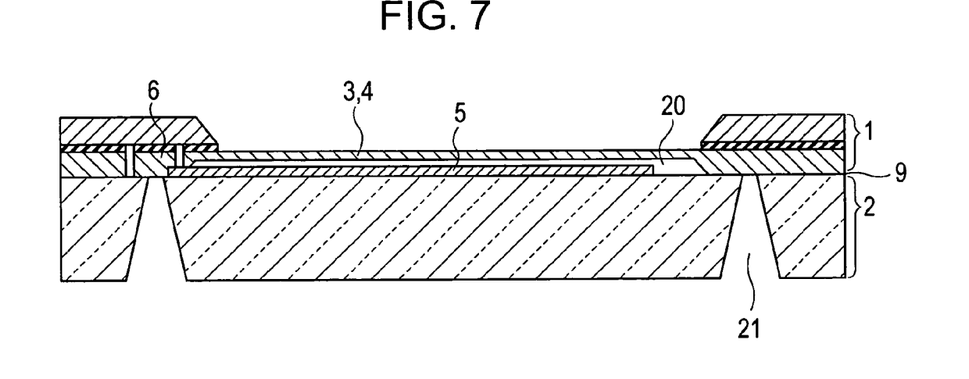
FIG. 7 illustrates the bonding step of the pressure sensor according to the present invention.
Figure 8:
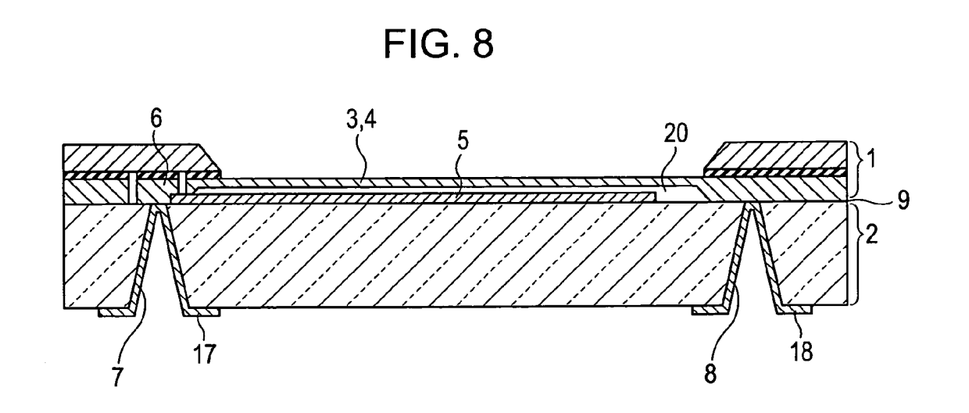
FIG. 8 is a sectional view illustrating the step of forming external connection electrodes of the pressure sensor according to the present invention.

FIGS. 5A, 5B, 5C, and 5D illustrate the steps of processing the SOI substrate 1. FIGS. 6A, 6B, and 6C illustrate the steps of processing the glass substrate 2. FIG. 7 illustrates the step of bonding the SOI substrate 1 and the glass substrate 2. FIG. 8 illustrates the step of forming the output electrodes 7 and 8 and the external connection electrodes 17 and 18.

First, the steps of processing the SOI substrate 1 are described below with reference to FIGS. 5A, 5B, 5C, and 5D.

The SOI substrate 1 is composed of the two silicon substrates 11 and 13 bonded with the insulating film 12, such as silicon dioxide ($SiO_2$) and aluminum oxide, disposed therebetween. This structure has been developed as a technique for contributing to lower power consumption as well as higher speed; a transistor can be formed on the silicon substrate 11 disposed on the insulating film 12 so as to minimize parasitic capacitance. The use of an SOI substrate enables relatively easy addition of various functions by a variety of semiconductor manufacturing techniques such as thermal diffusion and etching.

In the present invention, an SOI substrate is used to form a diaphragm for sensing pressure.

First, a microspace is formed as a reference pressure chamber. A predetermined pattern is formed on the surface of the silicon substrate 11 of the SOI substrate 1 by photolithography. The silicon substrate 11 is then etched by reactive ion etching (RIE) to form a depression 14 (see FIGS. 5A and 5B)

Protective films 29 such as thermal oxide films are formed on both surfaces of the SOI substrate 1, and only the part of one protective film 29 at which the groove 15, which surrounds the silicon island 6, is to be formed is etched away by photolithography to form a mask covering the other region. Referring to FIG. 5C, after the mask is formed, the groove 15 is formed by inductively coupled plasma (ICP) etching to define the silicon island 6, which is isolated from the surrounding silicon layer.

A diaphragm pattern is formed on the other protective film 29 of the SOI substrate 1 by photolithography using the same procedure as described above. The silicon substrate 13 is then etched down to the insulating layer 12 by anisotropic etching using KOH to form a recess 19, thus defining a diaphragm composed of the etched thin silicon substrate 11 and the insulating film 12 (see FIG. 5D).

Next, the steps of processing the glass substrate 2 are described below.

The glass substrate used is, for example, an alkali glass containing an alkali element, such as Pyrex® glass. Referring to FIGS. 6A and 6B, through holes 21 for drawing conductors from the first electrode 4 and second electrode 5 are formed at predetermined positions of the glass substrate 2 by, for example, sandblasting.

Then, the second electrode 5 is formed on a surface of the glass substrate 2 by sputtering or vacuum deposition using a stencil mask (see FIG. 6C).

Referring to FIG. 7, the SOI substrate 1 and glass substrate 2 thus processed are stacked and bonded in a vacuum such that a part of the silicon island 6 formed on the SOI substrate 1 is overlapped with an end of the second electrode 5 on the surface of the glass substrate 2.

The SOI substrate 1 and glass substrate 2 are bonded by a known method, namely anode bonding. Anode bonding is conducted by heating the stacked SOI substrate 1 and glass substrate 2 to 300° C. to 400° C. and applying a voltage of 500 V to 1 kV. As a result, large electrostatic attraction occurs between the SOI substrate 1 and the glass substrate 2 to chemically bond their bonding surfaces 9 without the use of a special binder. Anode bonding allows high-precision alignment in air or a vacuum, and has the advantage that it can be conducted with less strain because only the necessary part is heated. In addition, this method offers strong bonding without the use of a different material for bonding, so that the bonded surfaces can attain excellent durability. Furthermore, this method has the advantages of small variations between lots, a high yield, and labor saving through automation.

As a result of the bonding, a microspace is maintained in the center between the SOI substrate 1 and the glass substrate 2 to form the reference pressure chamber 20.

Referring to FIG. 8, finally, the output electrodes 7 and 8 for the first electrode 4 and second electrode 5 and the external connection terminals 17 and 18 are formed in the through holes 21 by sputtering or vacuum deposition using a stencil mask, thus completing a pressure sensor.

Figure 9:
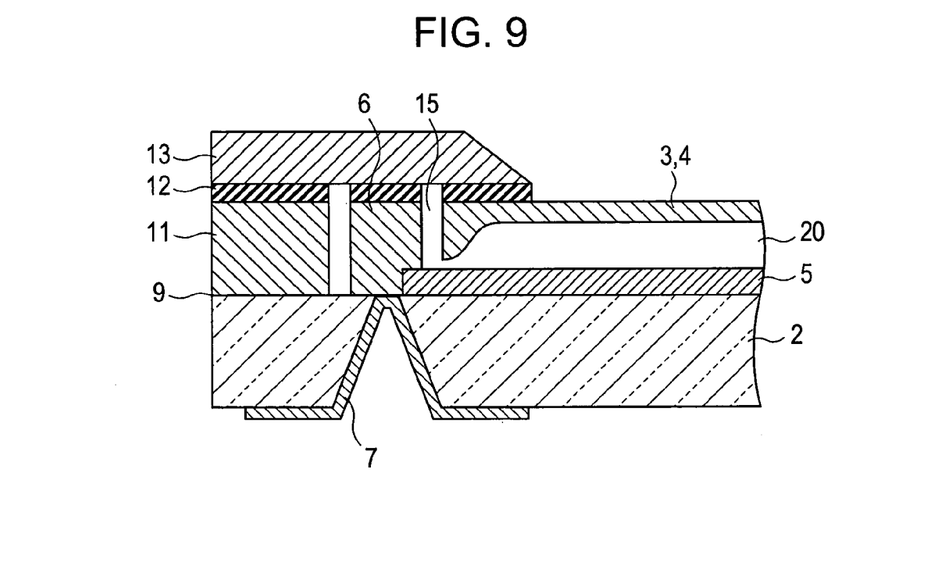
FIG. 9 is an enlarged view of the vicinity of a silicon island of the pressure sensor according to the present invention.

FIG. 9 is an enlarged view of the vicinity of the silicon island 6 of the pressure sensor according to the present invention. A part of the second electrode 5 formed on the surface of the glass substrate 2 facing the reference pressure chamber 20 is buried under the bottom of the silicon island 6 formed on the silicon substrate 11 of the SOI substrate 1 so that the second electrode 5 is electrically connected to the silicon island 6. In addition, the silicon island 6 is also electrically connected to the output electrode 7, for the second electrode 5, formed in the glass substrate 2. On the other hand, the silicon island 6 is electrically isolated by the groove 15 and the insulating film 12. Accordingly, the second electrode 5 is electrically connected to the output electrode 7 for the second electrode 5 via the silicon island 6. The bonding surfaces 9 of the silicon substrate 11 of the SOI substrate 1 and the glass substrate 2 are bonded by anode bonding so strongly that the hermeticity of the junction can be effectively maintained.

What is claimed is:

1. A capacitive pressure sensor for measuring pressure according to changes in interelectrode capacitance, the pressure sensor comprising:
    a silicon-on-insulator (SOI) substrate having a pressure-sensitive diaphragm portion that deflects in response to the pressure to be measured;
    a glass substrate bonded to the SOI substrate by anode bonding;
    a reference pressure chamber, for providing a reference value for the pressure to be measured, formed by sealing a microgap between the bonding sides of the two substrates in the position corresponding to the position where the pressure-sensitive diaphragm portion is formed;
    a first electrode formed on a surface of a silicon layer of the SOI substrate;
    a second electrode comprising a conductive material and being formed on the surface of the glass substrate facing the pressure-sensitive diaphragm portion in the reference pressure chamber;
    a silicon island formed on a part of the silicon layer of the SOI substrate bonded to the glass substrate, the silicon island being surrounded by a groove extending to an insulating layer of the SOI substrate;
    a second through hole formed in the glass substrate in the vicinity of the reference pressure chamber; and
    a second output electrode comprising a conductive material and being disposed inside the second through hole and electrically connected to the second electrode via the silicon island.

2. The pressure sensor according to claim 1, further comprising:
    a first through hole formed in the glass substrate in the vicinity of the reference pressure chamber; and
    a first output electrode comprising a conductive material and being disposed inside the first through hole and electrically connected to the first electrode at an end of the first through hole.

3. The pressure sensor according to claim 1, wherein the planar shape of the silicon island is circular or rectangular.

4. The pressure sensor according to claim 2, wherein the planar shape of the silicon island is circular or rectangular.

* * * * *